US012612777B2

(12) United States Patent
Wasser

(10) Patent No.: US 12,612,777 B2
(45) Date of Patent: Apr. 28, 2026

(54) BUILDING WITH HELIODYNAMIC ARCHITECTURE

(71) Applicant: ALCER, Soultz-sous-Forets (FR)

(72) Inventor: Eric Wasser, Cosswiller (FR)

(73) Assignee: ALCER, Soultz-sous-Forets (FR)

( * ) Notice: Subject to any disclaimer, the term of this patent is extended or adjusted under 35 U.S.C. 154(b) by 272 days.

(21) Appl. No.: 18/689,710

(22) PCT Filed: Sep. 8, 2022

(86) PCT No.: PCT/EP2022/074970
§ 371 (c)(1),
(2) Date: Mar. 6, 2024

(87) PCT Pub. No.: WO2023/036866
PCT Pub. Date: Mar. 16, 2023

(65) Prior Publication Data
US 2024/0384523 A1 Nov. 21, 2024

(30) Foreign Application Priority Data

Sep. 9, 2021 (FR) ...................................... 2109431

(51) Int. Cl.
E04B 1/32 (2006.01)
E04B 2/88 (2006.01)
F24S 20/61 (2018.01)

(52) U.S. Cl.
CPC .................. E04B 1/32 (2013.01); E04B 2/88 (2013.01); F24S 20/61 (2018.05)

(58) Field of Classification Search
CPC ............... E04B 1/32; E04B 2/88; F24S 20/61
See application file for complete search history.

(56) References Cited

U.S. PATENT DOCUMENTS 4,498,455 A * 2/1985 Gramm ................... F24S 80/50
                                                      359/597
D486,918 S * 2/2004 Wasser ........................... D25/33
(Continued)

FOREIGN PATENT DOCUMENTS

EP        2444559        4/2012
FR        2819836 A1     4/2003

OTHER PUBLICATIONS

English Translation of International Preliminary Report on Patentability Chapter II for PCT/EP2022/074970 (6 pages). (Year: 2024).*
(Continued)

*Primary Examiner* — Rodney Mintz
(74) *Attorney, Agent, or Firm* — IPSILON USA, LLP

(57) ABSTRACT

A building has outer envelope that has at least one facade portion which is transparent to solar radiation and that is situated on a face of the building, the shape of at least a part of which can be inscribed inside the surface generated by an imaginary segment extending between the sun and at least one fixed point that is fixed relative to the Earth. Facade portion(s) extend between a base line and a top edge which together delineate it from the remaining part of the outer envelope of the building, which is predominantly or completely opaque. The exterior face of each part of the facade portion is, at each point on the top line, set back from a straight line perpendicular to the local horizontal plane, and therefore normal to the plane of the ground, and passing through this point. At least one of the facade parts can be inscribed inside the surface of a cone frustum part that is recessed or concave relative to the face concerned.

15 Claims, 11 Drawing Sheets

(56)  References Cited

U.S. PATENT DOCUMENTS

| | | | | |
|---|---|---|---|---|
| 8,726,601 B2 * | 5/2014 | Naraghi | .............. | E04F 13/0871 |
| | | | | 52/573.1 |
| 8,863,462 B2 * | 10/2014 | Naraghi | .............. | E04F 13/0871 |
| | | | | 52/573.1 |
| 9,027,305 B2 * | 5/2015 | Naraghi | ................ | E04F 13/072 |
| | | | | 52/573.1 |
| 9,181,694 B1 * | 11/2015 | Munoz | ...................... | E04H 1/04 |
| 2011/0179723 A1 * | 7/2011 | Jacques | .................... | E04B 1/32 |
| | | | | 52/80.1 |
| 2012/0186167 A1 * | 7/2012 | Naraghi | .................. | F24S 20/61 |
| | | | | 52/173.3 |
| 2013/0305647 A1 * | 11/2013 | Naraghi | ................ | E04F 13/075 |
| | | | | 52/573.1 |
| 2014/0242334 A1 * | 8/2014 | Naraghi | .............. | E04F 13/0864 |
| | | | | 428/141 |
| 2015/0101271 A1 * | 4/2015 | Naraghi | .................. | F24S 20/61 |
| | | | | 52/173.3 |

OTHER PUBLICATIONS

Search Report dated Dec. 1, 2022.
International preliminary report dated Jul. 5, 2023.

* cited by examiner 1, 2

BUILDING WITH HELIODYNAMIC ARCHITECTURE

RELATED APPLICATION

This application is a National Phase of PCT/EP2022/074970 filed on Sep. 8, 2022, which claims the benefit of priority from French Patent Application No. 21 09431 filed on Sep. 9, 2021, the entirety of which are incorporated by reference.

The present invention relates to the field of the design and the construction of apartment blocks and buildings, notably for residential purposes or that are open to the public, the architecture of which is optimized with respect to the solar radiation, throughout the year. The subject of the invention is more particularly a building comprising at least one facade portion or part, advantageously substantially a determined entire facade, that is transparent to the rays of the sun, more particularly a building of which at least one facade has a heliodynamic architecture.

DESCRIPTION OF RELATED ART

Many apartment block or building constructions constructed in accordance with the movement of the sun and intended to exploit to the maximum the direct insolation in winter, and to be minimally exposed thereto in summer, are already known.

Thus, the inventor has designed and concretely produced a solar construction called "Heliodome" and described in the document FR 2 819 836.

This construction allows for the solar radiation to be maximally taken into account, but has a highly typical outer form (frustum with wide angle at the top), a complex architecture and an internal space that is relatively small compared to the spatial footprint of the construction and the habitability of which is not optimal, because of the volumes for which exploitation is difficult.

Through the evolution described in the document EP 2 444 559, and in order to overcome the abovementioned limitations, it has been proposed to incorporate the particular "Heliodome" form, or at least a fraction thereof, in a construction of more conventional form to have internal volumes that can be exploited more easily and to simplify the production thereof. In this evolution, the resulting construction comprises a transparent facade harmonized with the movement of the Earth. However, that done, and as the constructive solutions proposed in this document show, a trade-off has to be found between the performance levels in terms of controlled exploitation of the solar radiation and the relative size of the "Heliodome" specific part.

The expression controlled exploitation should be understood herein to mean not only the positive contribution of the "Heliodome" part in terms of lighting and direct heating by the sun during the periods of local weak/short solar lighting, but also the property of notably limiting the part of the direct solar lighting received in the internal volume of the building through this specific part, and therefore of guaranteeing that a relative coolness is maintained during the local periods of strong/long insolation. With global warming, this second property is also becoming a priority demand.

Furthermore, for an acceptable trade-off from an appearance and habitability point of view, the contribution of the "Heliodome" specific part to the heating and to the lighting of the building, in particular in winter, is necessarily restricted because its surface extension will necessarily be relatively limited. Conversely, to be able to have a good brightness inside the building by the solar radiation passing through the "Heliodome" part, the latter must be extended, which exposes it once again to a risk of insufficient limitation of the solar radiation in periods of significant exposure, except by scrupulously observing the forms disclosed by the abovementioned FR and EP documents, and therefore by reverting to architecturally and constructively limited forms, and therefore forms that are not applicable to more conventional constructions and to collective residence.

OBJECTS AND SUMMARY

The aim of the present invention is to propose a solution that addresses the above demand and to overcome the limitations of the abovementioned known solutions.

To this end, the invention proposes a building, notably a residential building or one open to the public, the outer envelope of which comprises at least one facade portion, preferentially an entire facade, which delimits an outside and an inside, which is transparent to the solar radiation, substantially over its entire surface, and which is situated on a face of said building oriented on the south side when said building is located in the northern hemisphere and conversely oriented on the north side of said building when the latter is located in the southern hemisphere, the form of at least a part of said at least one facade portion being inscribed substantially within the conical surface generated by an imaginary segment extending between the Sun and a corresponding point which is fixed with respect to the Earth, upon a complete rotation of the Earth on itself, said or each facade portion extending between a base line and a top line or edge which delimit it with respect to the remaining part of the outer envelope of the building, this remaining part being mostly or totally opaque, building characterized in that the external face of said or each abovementioned part of facade portion or facade is inscribed approximately within the surface of a part of a frustum, forming part of the conical surface generated by the above-mentioned imaginary segment and of which the imaginary top is the associated fixed point, in that the outer face of each abovementioned part of the facade portion is, at each point of the top edge, situated set back and inclined inward with respect to a straight line perpendicular to the local horizontal plane, that is to say a straight line normally perpendicular to the plane of the ground, and passing through this point of the top edge, and in that at least one of the abovementioned facade parts is inscribed within the surface of an abovementioned frustum part which is recessed or concave with respect to the face considered seen from the outside.

Thus, the invention relies on the unexpected and surprising discovery made by the inventor that it is also possible to exploit, for a given fixed point, also the cone or part of the cone (frustum) that is opposite or negative (in practice, generally an angularly limited part of this concave frustum), situated under the horizontal plane containing said fixed point, and do so in a manner equivalent to the positive or domed frustum, which is situated above said horizontal plane, is derived from the same fixed point and is exploited in the above-mentioned documents of the state-of-the-art. In the first case (concave or recessed frustum), the virtual fixed point will be situated above the top edge of the facade portion concerned and in the second case (convex or domed frustum) said virtual fixed point is situated below the base line of the facade concerned.

3

BRIEF DESCRIPTION OF THE DRAWINGS

The invention will be better understood, from the following description, which relates to preferred embodiments, given as non-limiting examples, and explained with reference to the attached schematic drawings, in which.

DETAILED DESCRIPTION

Figure 1A:
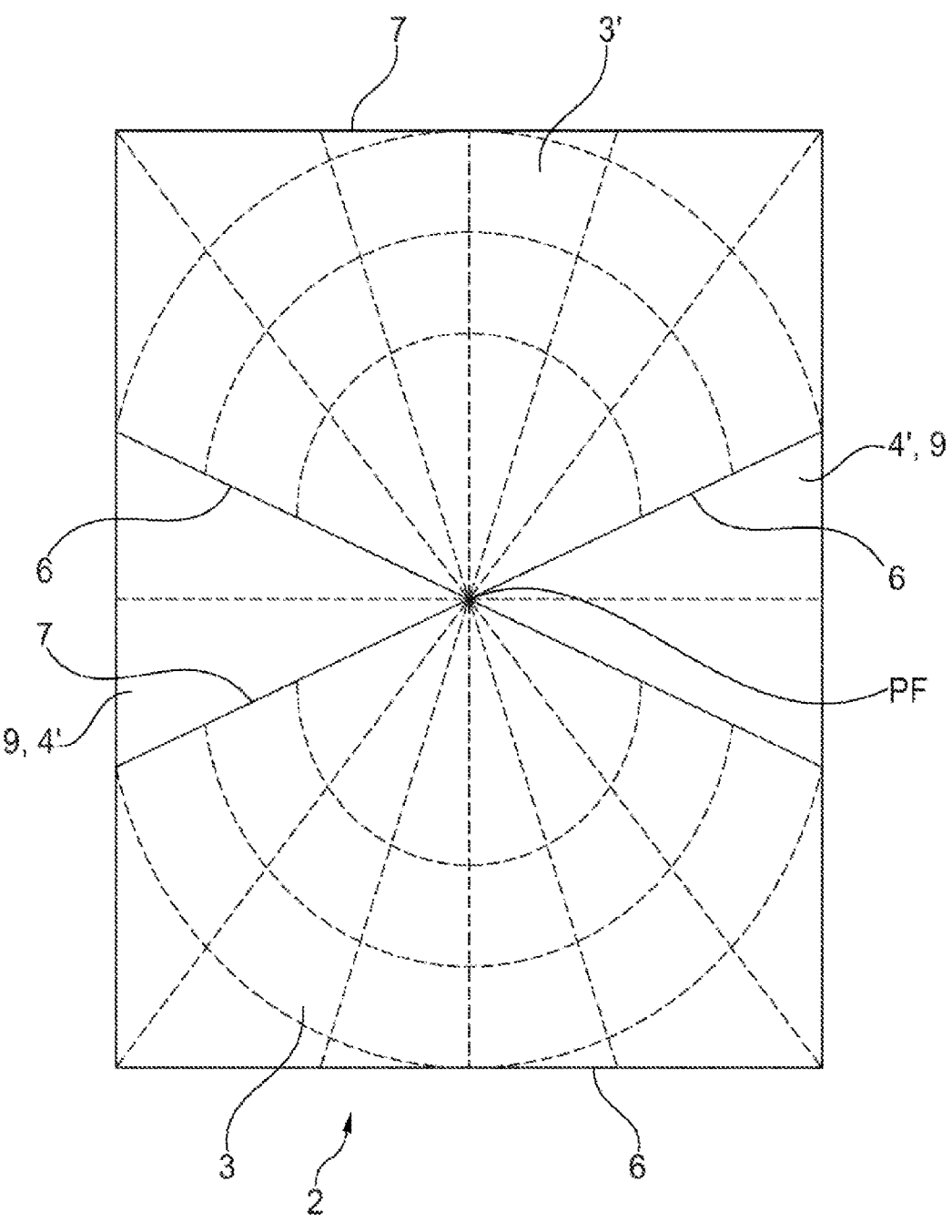
FIG. 1A.
Figure 1B:
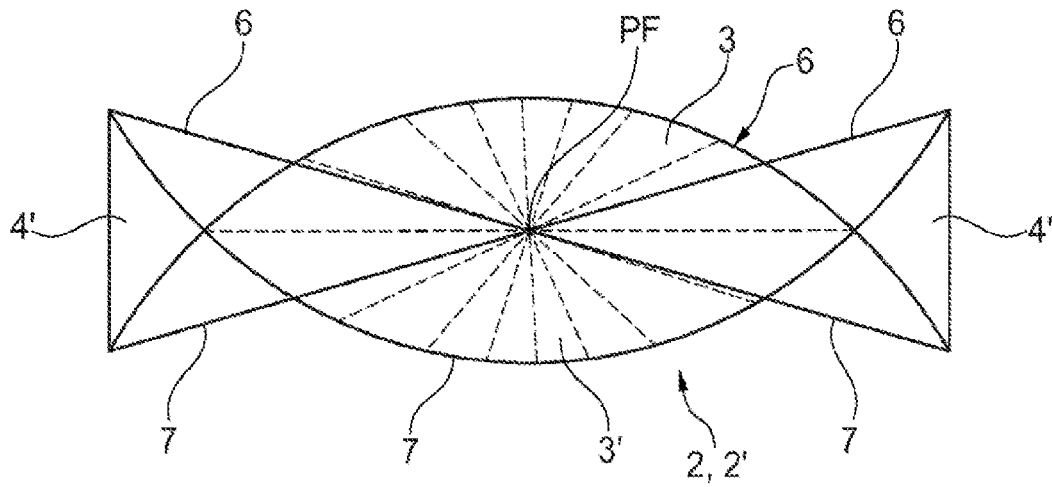
FIG. 1B.
Figure 1C:
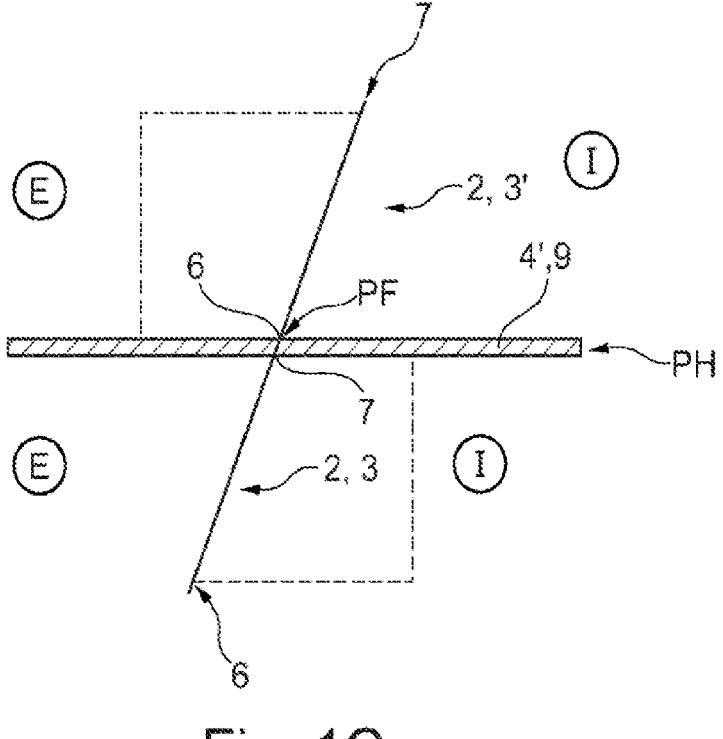
FIG. 1C.
Figure 1D:
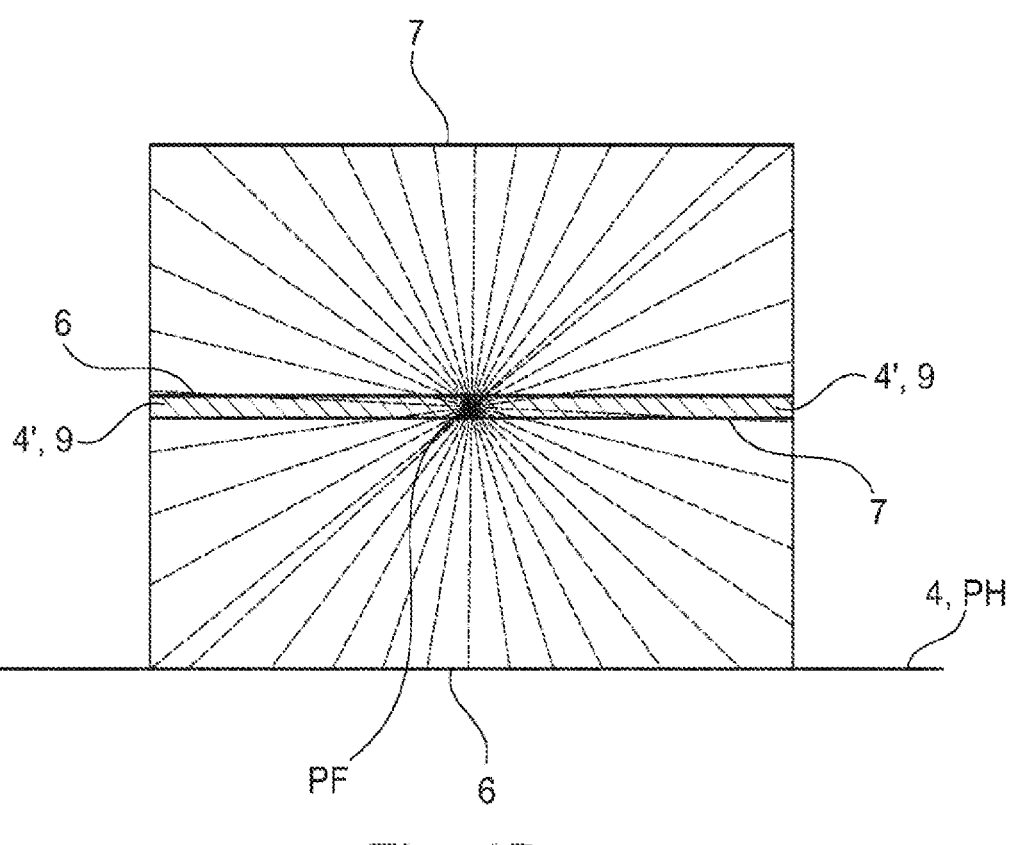
FIG. 1D are schematic views, respectively in perspective (1A-non-deforming perspective), from above (1B), in lateral elevation (and in cross-section on a vertical plane containing the fixed point and perpendicular to the facadez—–1C) and a front elevation (1D), of a facade portion of a building according to an embodiment of the invention, comprising a recessed facade portion (at the bottom) and a domed facade portion (at the top), which are mutually superposed and partially closely follow surfaces of cones which have the same fixed point (situated in the horizontal plane delimiting the two facade portions) and are symmetrical with respect thereto (in FIG. 1D, the facade portion rests on the ground)
Figure 2A:
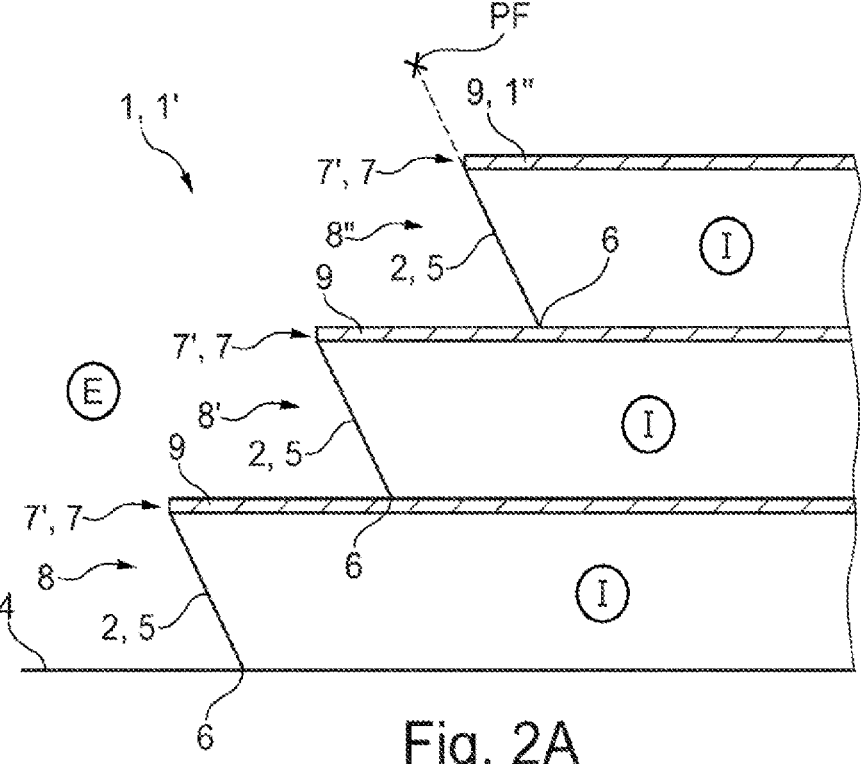
FIG. 2A.
Figure 2B:
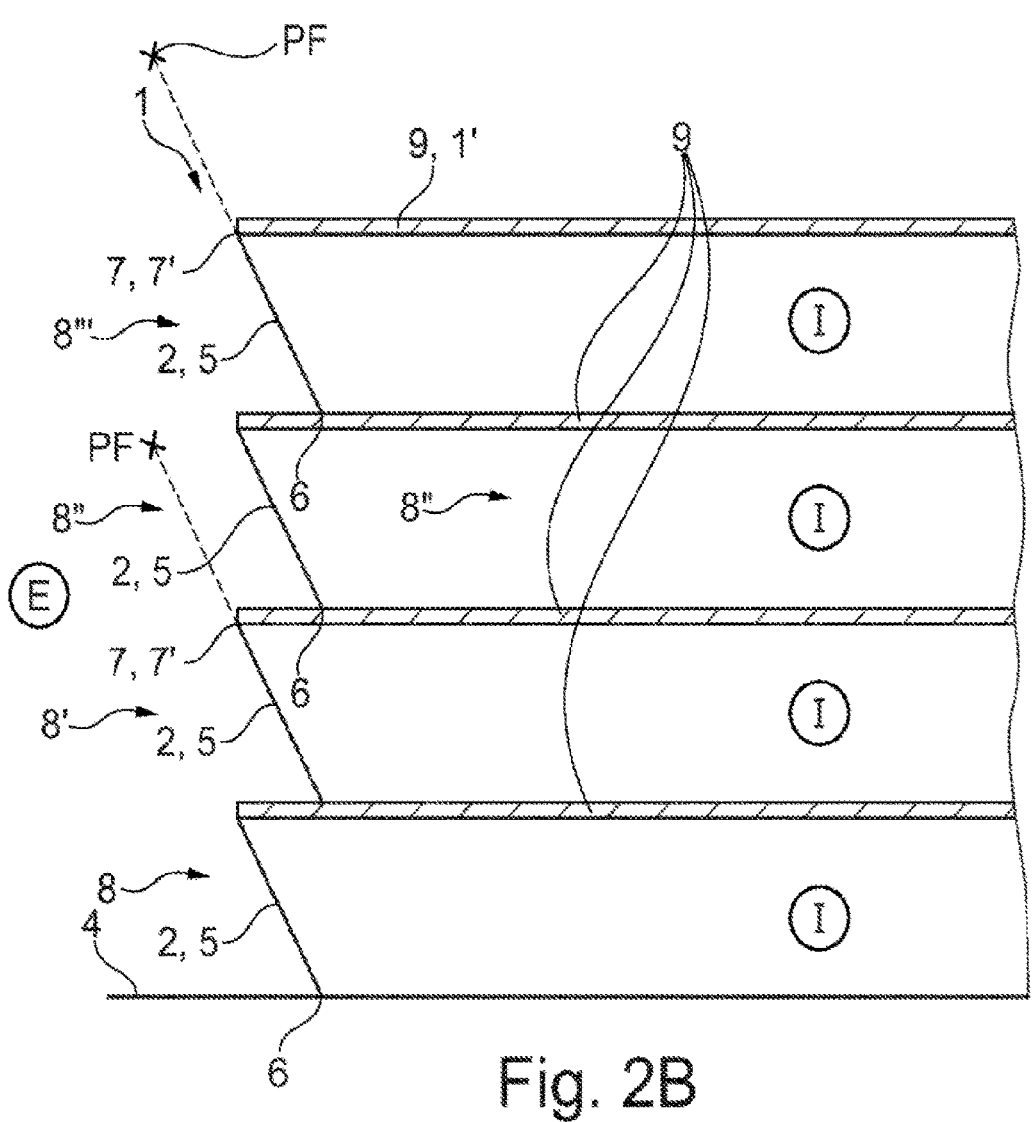
FIG. 2B are partial schematic cross-sectional views of two variant embodiments of a building in accordance with the invention, respectively with three and four levels or floors.

The invention relates to a building (1), notably a residential building or one open to the public, the outer envelope (1') of which comprises at least one facade portion (2), preferentially an entire facade, which delimits an outside (E) and an inside (I), which is transparent to the solar radiation, substantially over its entire surface, and which is situated on a face (2') of said building (1) oriented on the south side when said building is located in the northern hemisphere and conversely oriented on the north side of said building (1) when the latter is located in the southern hemisphere. The form of at least a part (3, 3') of said at least one facade portion (2) is inscribed substantially within the conical surface generated by an imaginary segment extending between the Sun and a corresponding point (PF) which is fixed with respect to the Earth, upon a complete rotation of the Earth on itself.

Said or each facade portion (2) extends between a base line (6) and a top line or edge (7) which together delimit it with respect to the remaining part (1") of the outer envelope (1') of the building (1), this remaining part (1") being mostly or totally opaque. This remaining part (1") can be formed by a roof which extends to the ground(S), by a roof associated with bearing external walls, or even by a roof or a top slab (9) and lateral walls in the case of apartment buildings with multiple floors.

In accordance with the invention, said building (1) is characterized in that the external face of said or each abovementioned part (3, 3') of facade portion or facade (2) is inscribed approximately within the surface of a part of a frustum, forming part of the conical surface generated by the abovementioned imaginary segment and of which the imaginary top is the associated fixed point (PF), in that the outer face of each abovementioned part (3, 3') of the facade portion (2) is, at each point of the top edge (7), situated set back and inclined inward (I) with respect to a straight line perpendicular to the local horizontal plane (PH), that is to say a straight line normally perpendicular to the plane of the ground (4), and passing through this point of the top edge (7), and in that at least one (3) of the above-mentioned facade parts (3, 3') is inscribed within the surface of an above-mentioned frustum part which is recessed or concave with respect to the face considered (2') seen from the outside (E). The expression "frustum part" is concretely understood here in to be a dished surface in band form extending over and angular fraction of a frustum, as FIGS. 2 to 7 show.

Figure 6A:
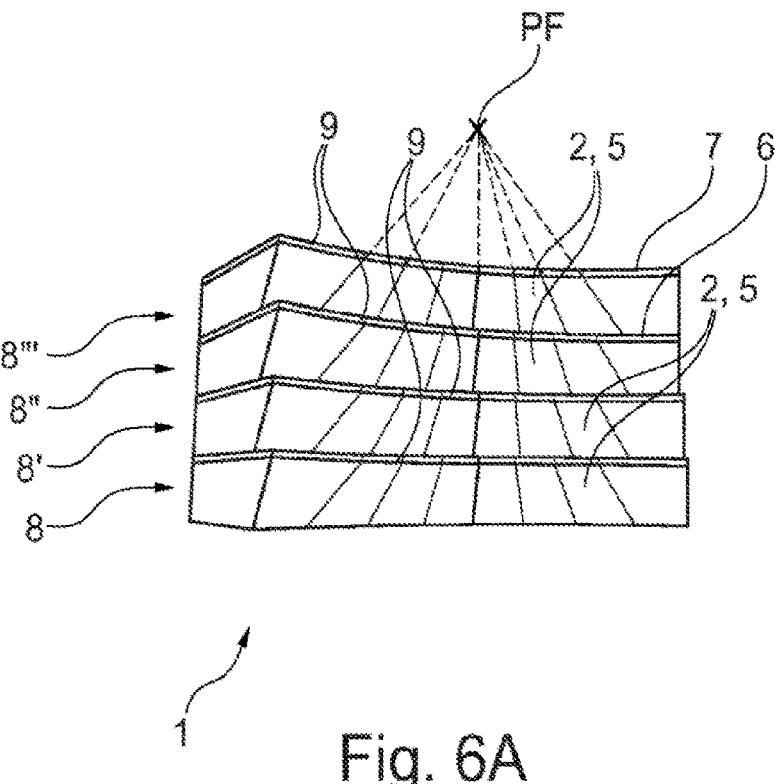
FIG. 6A.
Figure 6B:
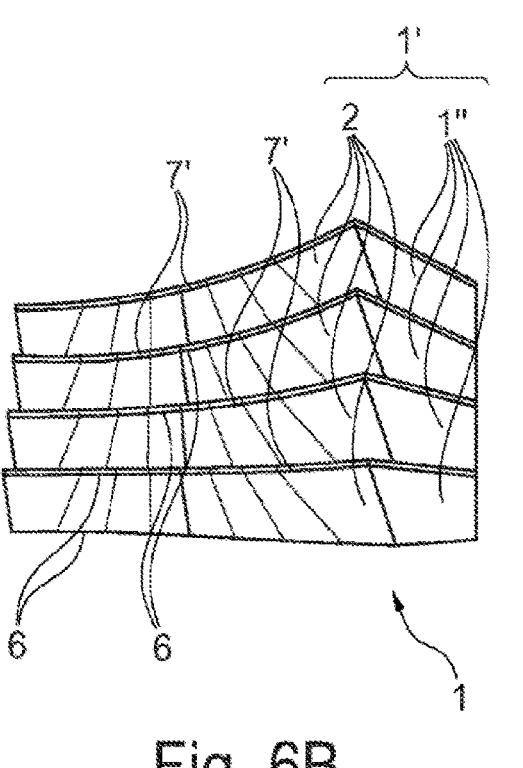
FIG. 6B are partial perspective views of a building with four floors in accordance with the invention, having a top edge similar to that of FIG. 3C and a structure similar to that of FIG. 2B, only the part of the building corresponding to the central part of the transparent facade being represented, and, FIG. 7 illustrates in thumbnail image form the penetration of the sun into a building as represented in FIGS. 6A and 6B, during certain particular days of the year and at certain times (location in the northern hemisphere—the lit facade parts are of white or clear color and the facade parts in the shade are greyed out).
Figure 7:
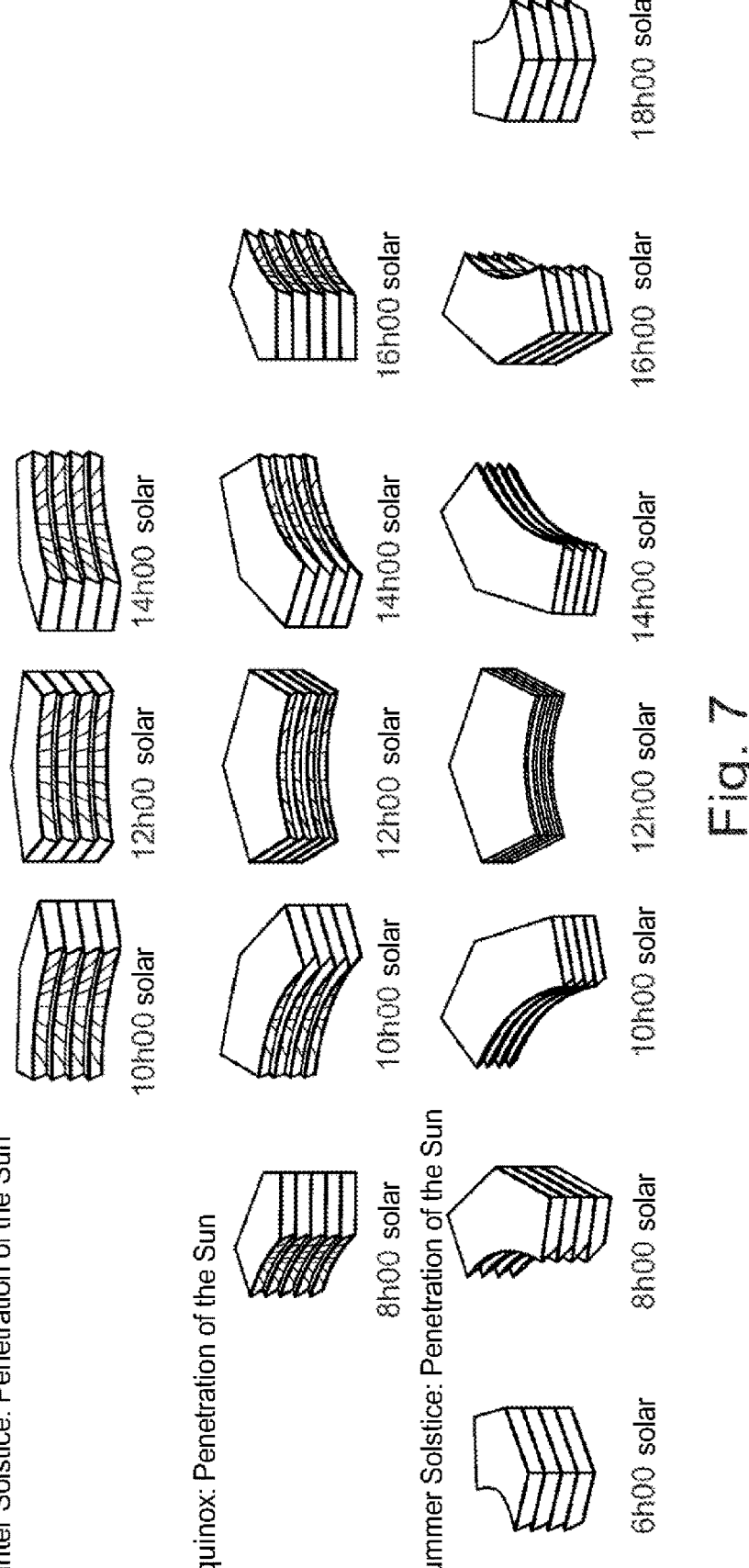

The facade portion (2) can possibly, according to a first embodiment, be composed only of recessed facade parts (3), as FIGS. 2, 6 and 7 show. In this embodiment, the fixed point of each facade portion is situated at height (virtual point) and the recessed frustoconical surface band exploited can be beneficially exploited for a construction in superposed floors. In a variant, one or more partial zones only of this facade portion or entire facade is or are composed of one or more such recessed facade parts (3) of frustoconical form (from the outside towards to inside).

In this case (concave or recessed frustum part), the virtual fixed point (PF) of the or each recessed facade part is situated above the top edge (7) of the facade portion concerned (see FIGS. 2A, 2B, 4A, 4C and 6A in which said virtual fixed point (PF) associated with the facade portion concerned is visible, as well as, partially, the cone of which a part in band form constitutes the frustum within which the corresponding facade part is inscribed).

It can also be noted that, in this configuration, the glazed facade (2) inclined outward from bottom to top, reflects the ground and not the sky or the horizon and consequently renders an image which corresponds visually to a material obstacle. This interesting ancillary property makes it possible to avoid having birds strike said glazed facade.

According to a second embodiment, emerging for example from FIGS. 1 and 3 to 5, at least one other (3') of the abovementioned facade parts (3, 3') is inscribed within the surface of a frustum part that is domed or convex with respect to the face considered (2'). In this case (convex or domed frustum), said virtual fixed point of the or each facade part (3') is situated below the base line (6) of the facade concerned.

In both the embodiments, it is possible to profit from great brightness in summer and in winter. However, by virtue of the specific forms exploited, the insolation will advantageously be grazing in summer (on the glazed facade portion), with the internal volume kept in the shade (coolness in summer).

Thus, the facades or facade portions targeted by the invention correspond to surface three-dimensional expressions of the tangents of the trajectories of the sun. These geometrical expressions can be expressed positively (space, domed form) or negatively (counter-space, recessed form) with respect to a vertical facade plane. Thus, the invention provides, by combining the two approaches, facades that are shaped by the sun, by being in accordance with its trajectories respectively in summer and in winter. It can also be noted notably that the sunset line on summer days corresponds to the sunrise line on winter days, and vice versa, with forms of cones and of frustums generated by the trajectories of the sun respectively followed on summer days (limiting input in summer) and on winter days (maximizing input in winter).

In particular, the recessed frustoconical facade portions specifically proposed by the invention allow, like the protruding (domed) frustoconical portions, both a great brightness together with a total direct non-insolation in summer and a maximal insolation in winter. This then culminates in a cool and light interior (I) (glazed surface) in summer, because the glazed facade is protected from a direct exposure to the sun (in the shade), and exposed from the first to the last ray of sun in winter (optimal accommodation of winter insolation).

In accordance with a first variant of the abovementioned second embodiment and as FIG. 1 notably show (in the case of frustum parts that are almost entire cone portions), at least a part of the domed facade (3') and at least a recessed part (3) are arranged so as to be superposed, by being separated by a horizontal plane (PH), this plane containing the base line (6) of the upper facade part (3, 3') and the top line (7) of the lower facade part (3, 3'). In the embodiment illustrated in FIGS. 1, which can constitute a base module that can be repeated to form a facade portion (2), the two facade parts (3 and 3') extend to the tops of their respective frustums, these tops coinciding with and corresponding to a common fixed point.

As FIG. 1 show, this superpositioning makes it possible to define two triangular surfaces (4') in the horizontal plane (PH), said triangles being of isosceles form, symmetrical with respect to the fixed point (PF) and linked by their tips at said point. These two triangular surfaces, the edges of which define a Saint Andrew's cross, separate the two facade parts (3 and 3') and can for example correspond to zones of a slab (9) separating two floors and physically embodying said plane in an apartment block with two floors and two corresponding glazed facade portions (2). The aligned isosceles sides of the two triangles define two crossed straight lines and correspond respectively to the lines of the sun rising in winter and of the sun setting in winter.

In the context of the second embodiment of the invention, the fixed point is situated also at height (not on the ground)

and the volumes of the space (domed form) and the counter-space (recessed form) are equally exploited.

In accordance with a second variant of this second embodiment, that can easily be used in the context of an apartment block with several levels and having glazed bays of large transverse dimensions, illustrated as examples in FIGS. 4 and 5, at least a part of the domed facade (3') and at least a part of the recessed facade (3) are arranged horizontally (or transversely) contiguously, with a continuity of their base line (6) and of their top line (7).

According to another advantageous variant embodiment, emerging from FIGS. 2 to 5, the facade of the face (2') considered of said building (1) is subdivided into at least two facade portions (2) in the form of superposed bands which are, on the one hand, each formed by a succession of at least two facade parts (3, 3') comprising at least two recessed facade parts (3) and/or at least two domed facade parts (3'), mutually contiguous horizontally, and, on the other hand, separated from one another vertically by a horizontal plane (PH), this plane containing the base line (6) of the upper facade part (3, 3') and the top line (7) of the lower facade part (3, 3').

By way of advantageous embodiment, each facade portion (2) is formed by a succession of contiguous recessed facade parts (3), if necessary being terminated at its two opposite ends by domed facade parts (3'), and each facade portion (2) corresponds to or is associated with a floor of the building (1) with multiple floors, the facade portions (2) of the upper floors being set back with respect to the facade portions (2) of the respective lower floors.

In accordance with the invention, and as FIG. 3 schematically show, provision can be made: for each facade portion (2), in band form and which extends preferentially in a single piece over the entire width of the face (2') considered of the building (1), to be formed by three constituent parts that are contiguous and adjacent in a direction substantially parallel to the side concerned of the building (1), namely, a central part (5) and two opposite end parts; for at least one, preferentially each, of the two end parts to correspond to a domed facade part (3') and for the central part (5) of said facade portion (2) to be composed of multiple recessed facade parts (3) which are connected continuously to one another and, if necessary, to the or each of the two end facade parts (3'), at the top edge (7), the base line (6) and at their respective outer surfaces.

Figure 3A:
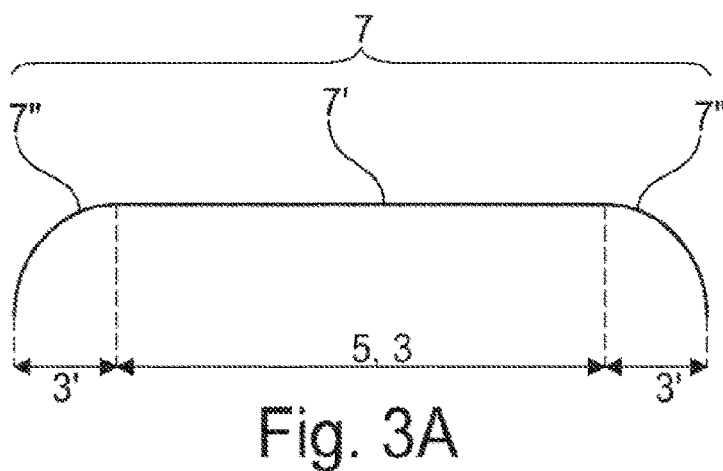
FIG. 3A.
Figure 3B:
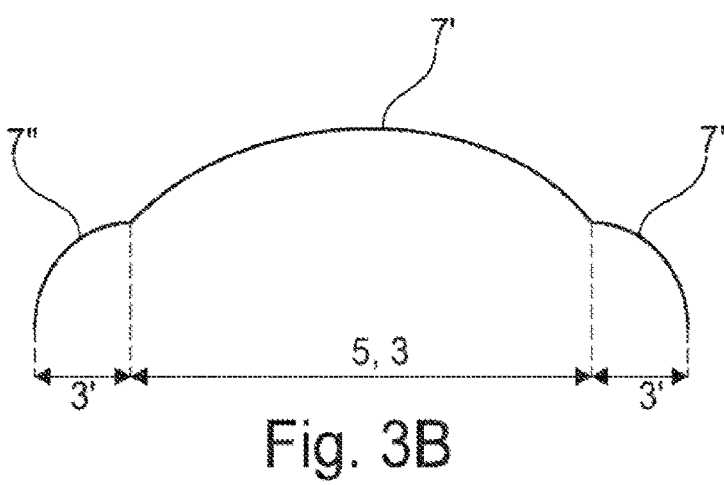
FIG. 3B.
Figure 3C:
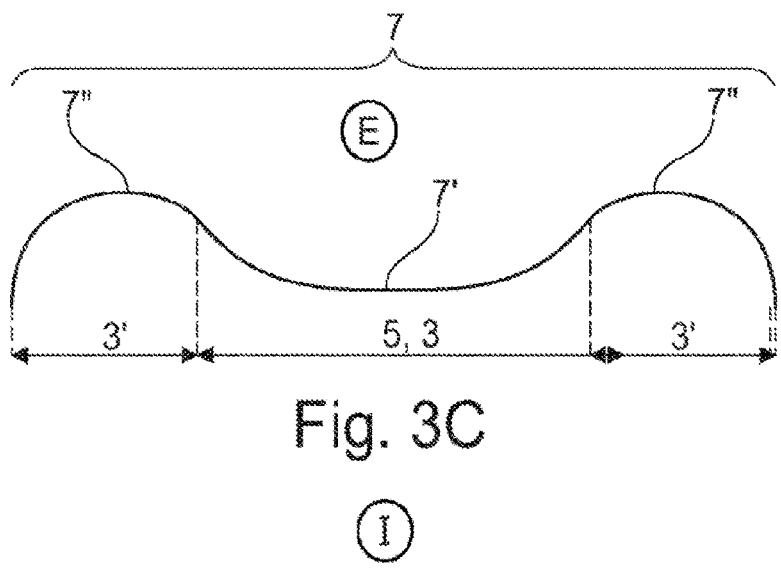
FIG. 3C.

More specifically, the portion (7') of the top line (7) associated with the central facade part (5) can have, seen from above or in projection on the horizontal plane or plane of the ground (4), an extension that is substantially rectilinear, concave dished or convex dished between the top ends of the portions (7") of the top line (7) associated with the two domed end facade parts (3'), ends that it links to one another (FIGS. 3A to 3C).

Figure 3D:
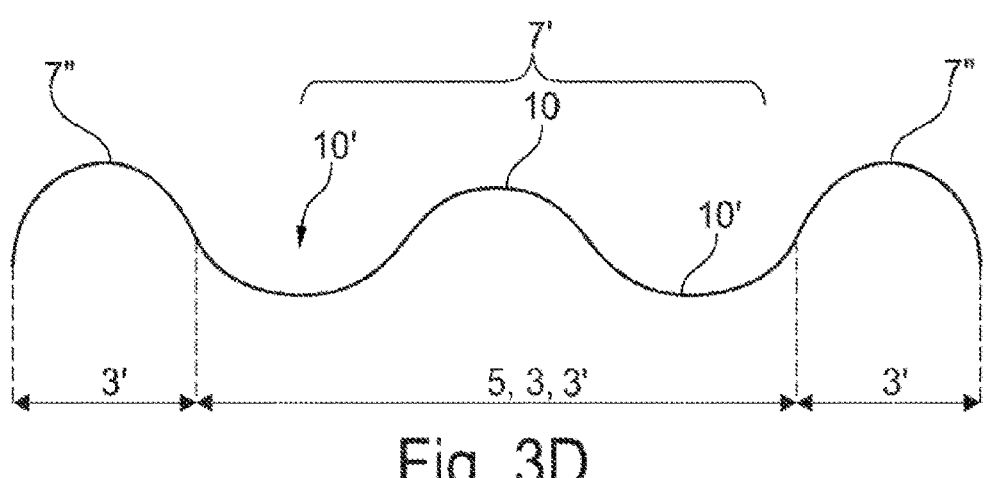
FIG. 3D are schematic representations, seen from above, of different forms of top edges corresponding to different constructive configurations of buildings and of facades that are transparent to the solar radiation in accordance with the invention.
Figure 4A:
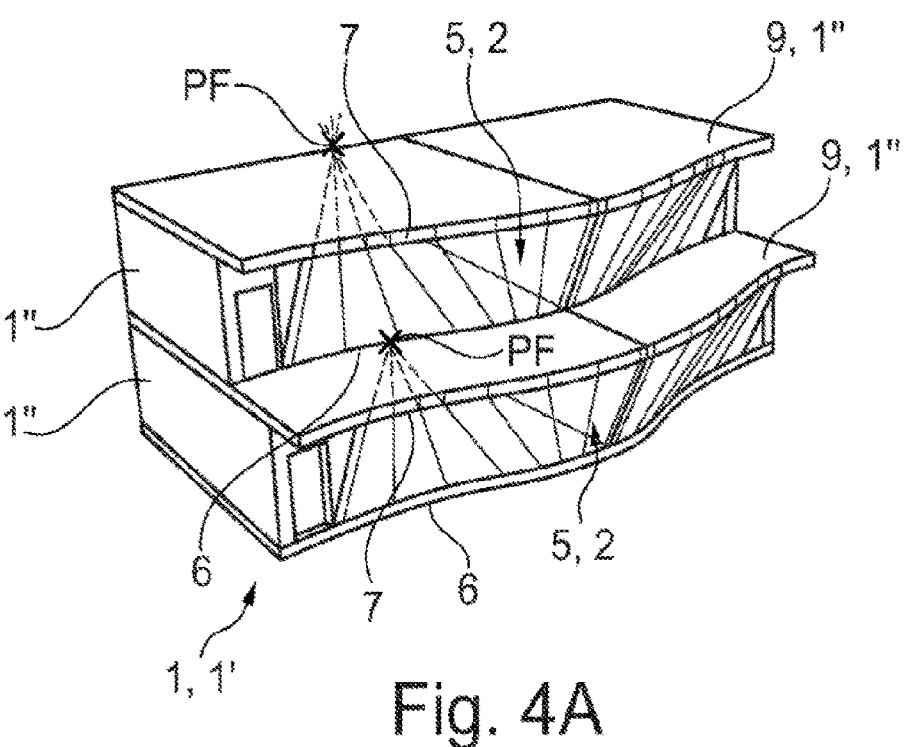
FIG. 4A.
Figure 4B:
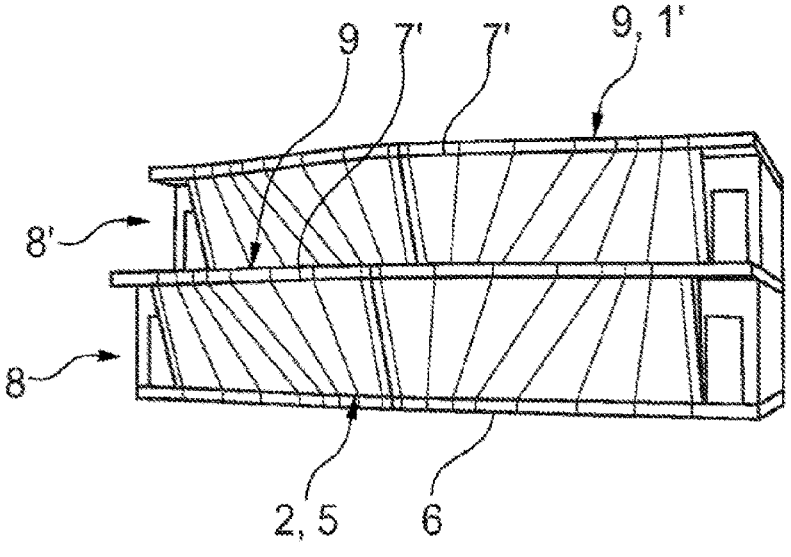
FIG. 4B.
Figure 4C:
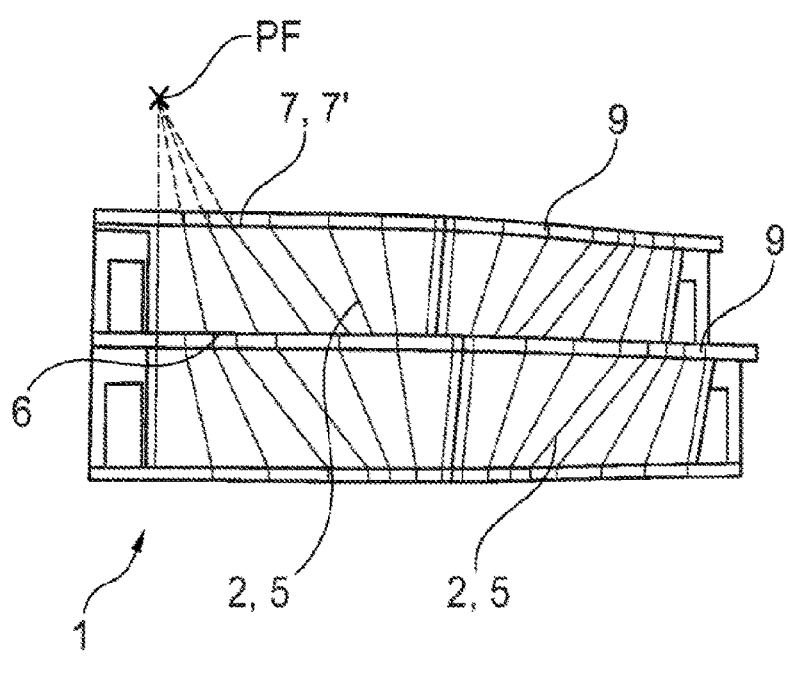
FIG. 4C.
Figure 4D:
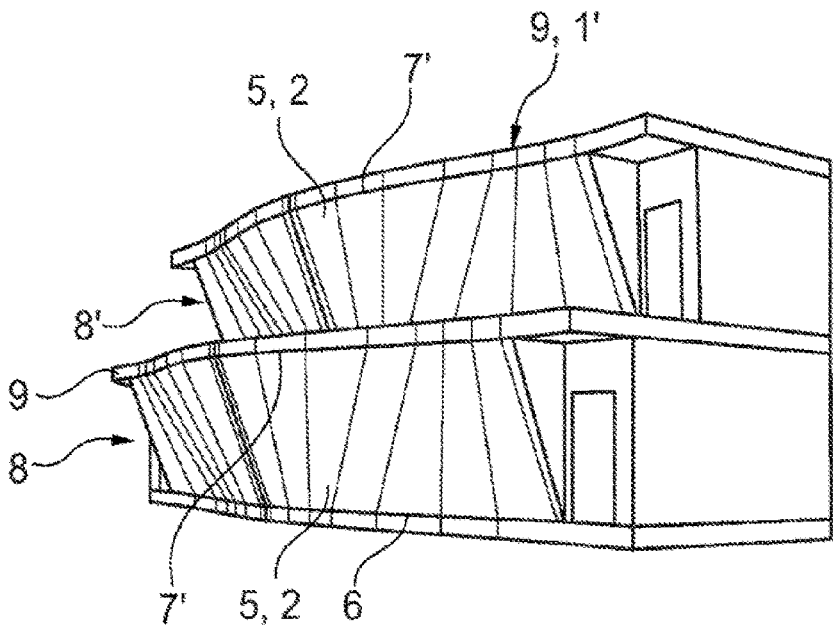
FIG. 4D are perspective views from different directions of a building with two floors in accordance with the invention and having top edges similar to those of FIG. 3B (if necessary only the part of the building corresponding to the central part of the transparent facade being represented)
Figure 5A:
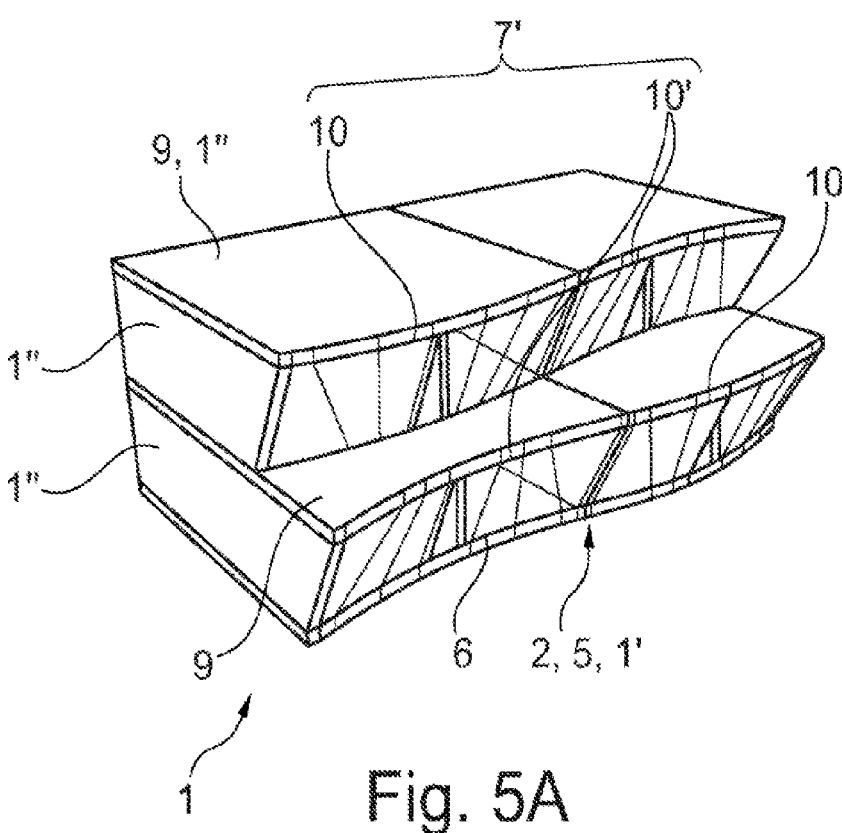
FIG. 5A.
Figure 5B:
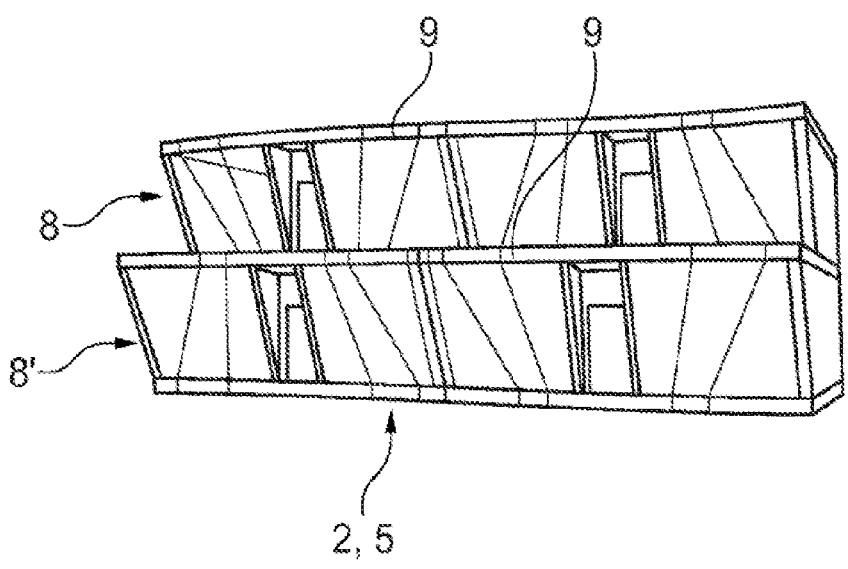
FIG. 5B.
Figure 5C:
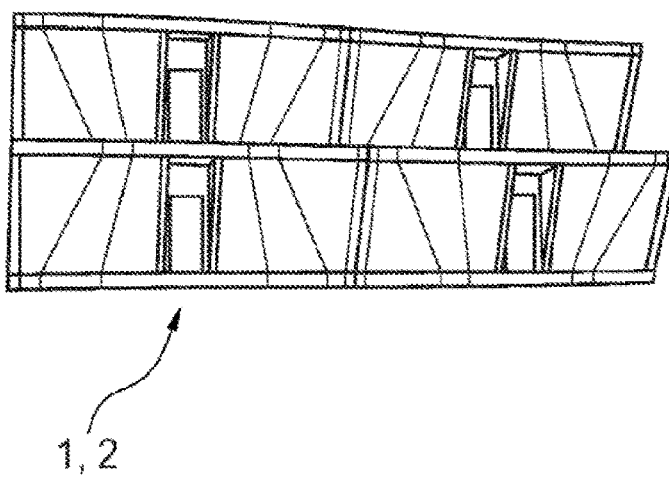
FIG. 5C.
Figure 5D:
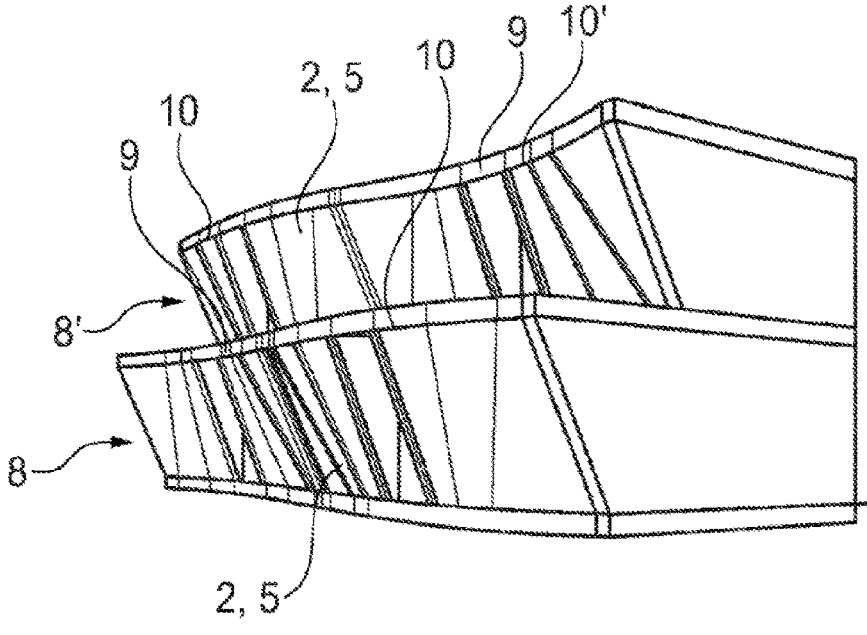
FIG. 5D are perspective views from different directions of a building with two floors in accordance with the invention and having other forms of top edges that are mutually dissimilar (if necessary only the part of the building corresponding to the central part of the transparent facade being represented)

In a variant, and as FIGS. 3D, 4 and 5 show, the portion (7') of the top line (7) associated with the central facade part (5) has, seen from above or in projection on the ground (4), a corrugated form with at least one concave segment (10) and at least one convex segment (10'), and links together the top ends of the portions (7") of the top line (7) associated with the two end facade parts (3').

It can be noted that, in FIGS. 4 to 7, the domed end facade parts (3'), possibly present, are not represented, the glazed facade portions (2) being delimited laterally by vertical walls.

It also emerges from FIGS. 4 to 6 that the different glazed facade portions (2) are composed of sheets or panels of glass of conjugate and complementary forms allowing them to be assembled juxtaposed edge-to-edge and each oriented to follow as closely as possible the theoretical surface resulting from the application of the constructive principles of the invention set out herein. The broken lines of FIG. 1A can, for their part, delimit a configuration of elementary glass sheets for the production of this figure.

Preferentially and as FIGS. 3A and 3B show by way of examples, the top ends of the portions (7") of the top line (7) associated with the two end facade parts (3') each correspond to the culminating point of the respective frustum part with respect to the ground (4)—ground-forming terrain or slab, the frustum parts corresponding respectively to the two domed end facade parts (3') possibly having a similar and complementary angular amplitude.

In accordance with an advantageous practical constructive embodiment, emerging also from FIGS. 3 to 6, the building (1) comprises at least two superposed floors or levels (8, 8', 8", 8''') and each of which comprises at least one facade portion (2) and which are separated from one another by a respective slab (9), the or each slab (9) separating two superposed floors or levels corresponding to the ground for the floor or the level situated immediately above and to a part of the rest of the outer envelope (1') for the level of the floor situated immediately below. In addition, the top lines (7) of all the superposed levels or floors (8, 8', 8", 8''') are of identical forms, said top edges (7) being either all superposed vertically coincidentally, or, each time offset to the rear or set back with respect to the immediately lower top line (7).

Obviously, the invention is not limited to the embodiments described and represented in the attached drawings. Modifications remain possible, notably from the point of view of the construction of the various elements or by the substitution of technical equivalents, without in any way departing from the scope of protection of the invention.

The invention claimed is:

1. A building with heliodynamic architecture comprising:
an outer envelope which has one or more façade portions defining an entire façade which delimits an outside and an inside, at least one said façade portion being transparent to solar radiation substantially over an entire surface thereof, and which is situated on an outer face of said building oriented on a south side when said building is located in a northern hemisphere location and, conversely oriented on a north side of said building when the building is located in a southern hemisphere location, at least a substantial part of said at least one façade portion being inscribed substantially inside a conical surface generated by an imaginary segment extending between the Sun and a corresponding point which is fixed with respect to the Earth, upon a complete rotation of the Earth,
said at least one façade portion extending between a base line and a top line or edge of the entire façade which delimit said at least one façade portion with respect to a remaining part of the outer envelope of the building, this remaining part being mostly substantially opaque or totally opaque,
wherein an outer face of said at least substantial part of said at least one façade portion or the entire façade is inscribed substantially inside a surface of a part of a frustum, forming the conical surface generated by the imaginary segment, which is situated under a horizontal plane containing the corresponding fixed point and an imaginary vertex of which is said corresponding fixed point, which is situated above the top line or edge of the substantial part of each façade portion, in that the outer face of each façade portion is, at the top line or edge, situated set back and inclined inward with respect to a straight line perpendicular to the horizontal plane and a plane of a ground surface, and passing through the top line or edge, and said at least one façade portion or the entire façade is inscribed inside the surface of the frustum part and is recessed or concave with respect to the outer face of the building.

2. The building as claimed in claim 1, wherein said building comprises at least two superposed floors or levels each of which comprises at least one façade portion and which are separated from one another by at least one respective slab, the at least one slab separating two superposed floors or levels corresponding to the ground surface for the floor or level situated immediately above and to a part of a remainder of the outer envelope for the level or floor situated immediately below, and in that top lines or edge of all the superposed levels or floors are of identical forms, said top lines or edges being either all superposed in a vertically coincident manner, or each time offset toward a rear or set back with respect to immediately lower top line or edge.

3. The building as claimed in claim 1, wherein said building is one of a residential building or a public building.

4. The building as claimed in claim 1, wherein said at least one façade portion comprises the entire façade of the building.

5. The building as claimed in claim 1, wherein at least a second said façade portion is inscribed inside the surface of the frustum part and is domed or convex with respect to the outer face of the building.

6. The building as claimed in claim 5, wherein the domed façade portion and the recessed façade portion are arranged in a superposed manner, by being separated by the horizontal plane, this horizontal plane containing the base line of an upper façade portion and the top line or edge of a lower façade portion.

7. The building as claimed in claim 5, wherein the domed façade portion and the recessed façade portion are arranged horizontally contiguously, with a continuity of the base line and of the top line or edge.

8. The building as claimed in claim 1, wherein the entire façade is subdivided into at least two façade portions of superposed bands which are each formed by a succession of at least two façade parts having at least one of at least two recessed façade parts or at least two domed façade parts, horizontally mutually contiguous, and separated from one another vertically by the horizontal plane, said horizontal plane containing the base line of an upper façade part and the top line or edge of a lower façade part.

9. The building as claimed in claim 8, wherein each façade portion is formed by a succession of contiguous recessed façade parts, optionally being terminated at opposite ends by domed façade parts, and in that each façade portion corresponds to or is associated with a floor of the building with multiple floors, the façade portions of upper floors being set back with respect to the façade portions of respective lower floors.

10. The building as claimed in claim 8, wherein each façade portion, in band form, is formed by three constituent parts that are contiguous and adjacent in a direction substantially parallel to the north or south side of the building, namely a central part and two opposite end parts, in that at least one of the two end parts corresponds to a domed façade part and in that the central part of each façade portion is composed of several recessed façade parts which are connected continuously together and, optionally, to the or each of the two end façade parts, at the top line or edge, the base line and on respective outer surfaces thereof.

11. The building as claimed in claim 10, wherein each façade portion, in band form, extends in a single piece over an entire width of the outer face of the building.

12. The building as claimed in claim 10, wherein the three constituent parts of each façade portion are contiguous and adjacent in the direction substantially parallel to the north or south side concerned of the building, including the central part and the two opposite end parts, and wherein each of the two end parts corresponds to a respective said domed façade part.

13. The building as claimed in claim 10, wherein the façade portion of the top line or edge associated with the central façade part has, seen from above and in projection on the horizontal plane or plane of the ground surface, an extension that is substantially rectilinear, concave dished or convex dished between top ends of the façade portions of the top line or edge associated with the two domed end façade parts, ends linked together.

14. The building as claimed in claim 10, wherein the façade portion of the top line or edge associated with the central façade part has, seen from above and in projection on the ground surface, a corrugated form with at least one concave segment and at least one convex segment, and links together the top ends of the façade portions of the top line or edge associated with the two end façade parts.

15. The building as claimed in claim 10, wherein the top ends of the façade portions of the top line or edge associated with the two end façade parts each correspond to a culminating point of the frustum part with respect to the ground surface, the frustum part respectively corresponding to the two domed end façade parts, optionally having a similar and complementary angular amplitude.

\* \* \* \* \*